E. R. CARR.
Check-Rower Attachment for Corn-Planters.
No. 199,410. Patented Jan. 22, 1878.
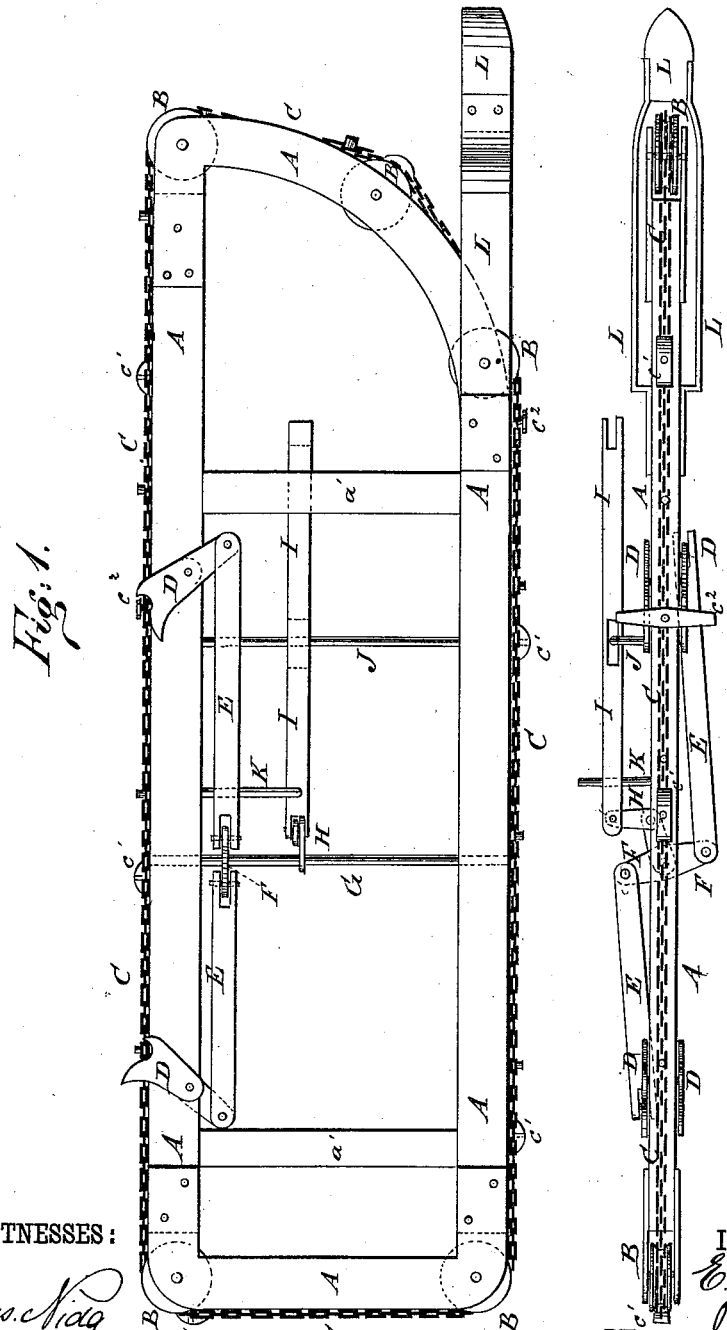

UNITED STATES PATENT OFFICE.

EDWARD R. CARR, OF AVON, ILLINOIS.

IMPROVEMENT IN CHECK-ROWER ATTACHMENTS FOR CORN-PLANTERS.

Specification forming part of Letters Patent No. 199,410, dated January 22, 1878; application filed November 30, 1877.

*To all whom it may concern:*

Be it known that I, EDWARD RANDOLPH CARR, of Avon, in the county of Fulton and State of Illinois, have invented a new and useful Improvement in Check-Row Attachments for Corn-Planters, of which the following is a specification:

Figure 1 is a side view of my improved attachment. Fig. 2 is a top view of the same.

Similar letters of reference indicate corresponding parts.

The object of this invention is to furnish an improved device for attachment to corn-planters to drop the seed and mark the ground, so that the seed may be planted in accurate check-row, and which shall be simple in construction, light, durable, convenient in use, and accurate in operation.

The invention consists in the combination of the runner-frame, provided with the pulleys, the endless chain, provided with the blocks and the cross-cleats, the two pairs of trip-levers, the two connecting-bars, the equal-armed lever, the pivoted rod, the arm, the lever, and the fulcrum-rod, with each other, to adapt the device to be attached to a corn-planter for operating its seed-dropping slide.

A is the frame, the top and bottom bars of which are horizontal, the rear end bar is vertical, and the forward end bar is curved like the forward end of a runner.

The top and bottom bars of the runner-frame A are connected at a little distance from the ends of the bottom bar by two upright bars, $a'$, the rear one of which is attached to the rear part of the planter, and the forward one is attached to the planter a little in the rear of the seed-box.

In slots in the ends of the top and bottom bars, and in the middle part of the curved forward bar, are pivoted grooved pulleys B, around which passes an endless chain, C. The bearings for one of the rear pulleys B should be made adjustable, so that it may be adjusted to tighten or slacken the chain C.

To the endless chain C are attached blocks $c^1$, to prevent the said chain from slipping upon the ground.

To the chain C are also attached short cross-cleats $c^2$, at distances apart equal to the required distance apart of the hills, to mark the ground, and also to operate the seed-dropping device.

To the top bar of the runner-frame A are pivoted two pairs of trip-levers, D, the upper ends of which are so formed as to be struck and operated by the cross-cleats $c^2$ as the chain C moves forward along the top bar of the runner-frame A.

One of each pair of levers D upon the opposite sides of said top bar is extended downward, and to it is pivoted the outer end of one of the connecting-bars E. The inner ends of the connecting-bars E are pivoted to the ends of the equal-armed lever F, the center of which is rigidly attached to the upright rod G.

The ends of the rod G work in bearings in the top and bottom bars of the runner-frame A, and to the said rod, a little below the equal-armed lever F, is rigidly attached an arm, H, to which is pivoted the end of a lever, I. The middle part of the lever I has a short longitudinal slot formed in it to receive the fulcrum-rod J, the ends of which are bent inward, and are attached to the top and bottom bars of the runner-frame A.

K is a rod attached to the top bar of the frame A, and its lower part is bent outward, and passes through a hole in the rear end of the lever I, to support the said rear end and prevent it from binding upon the arm H as the said lever moves up and down upon the fulcrum-rod J when the machine is passing over uneven ground. The forward end of the lever I is designed to be connected with the seed-dropping slide of the planter, so that the said dropping-slide may be operated to drop the seed as each cross-cleat $c^2$ comes in contact with each pair of levers D.

To the forward end of the bottom bar of the runner-frame A is attached a colter, L, to cut off obstructions, and push back clods, &c., to leave a clear space for the seed and for the runner-frame. The runner-frame A is designed to be made nine feet, more or less, in length, so that it cannot drop into holes and hollows and interfere with the proper operation of the planter.

Having thus described my invention, I claim as new and desire to secure by Letters Patent—

The combination of the runner-frame A, provided with the pulleys B, the endless chain C, provided with the blocks $c^1$ and the cross-cleats $c^2$, the two pairs of trip-levers D, the two connecting-bars E, the equal-armed lever F, the pivoted rod G, the arm H, the lever I, and the fulcrum-rod J, with each other, substantially as herein shown and described, to adapt the device to be attached to a corn-planter for operating its seed-dropping slide.

EDWARD R. CARR.

Witnesses:
ALBERT B. TOMPKINS,
LAWRENCE HOLLISTER.